United States Patent
Gong et al.

(10) Patent No.: US 10,808,188 B2
(45) Date of Patent: Oct. 20, 2020

(54) CATALYTIC CRACKING PROCESS WITH INCREASED PRODUCTION OF A GASOLINE HAVING A LOW OLEFIN CONTENT AND A HIGH OCTANE NUMBER

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jianhong Gong, Beijing (CN); Zekun Li, Beijing (CN); Jinlian Tang, Beijing (CN); Anguo Mao, Beijing (CN); Jiushun Zhang, Beijing (CN); Yuying Zhang, Beijing (CN); Jun Long, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 45 days.

(21) Appl. No.: 16/141,619

(22) Filed: Sep. 25, 2018

(65) Prior Publication Data
US 2019/0093028 A1    Mar. 28, 2019

(30) Foreign Application Priority Data

Sep. 26, 2017   (CN) .......................... 2017 1 0883617
Sep. 26, 2017   (CN) .......................... 2017 1 0884528

(51) Int. Cl.
C10G 69/04    (2006.01)
C10G 11/18    (2006.01)
(Continued)

(52) U.S. Cl.
CPC ................ *C10G 69/04* (2013.01); *B01J 8/28* (2013.01); *C10G 11/05* (2013.01); *C10G 11/18* (2013.01);
(Continued)

(58) Field of Classification Search
CPC ...... C10G 69/04; C10G 11/18; C10G 11/182; C10G 11/05; C10G 51/026;
(Continued)

(56) References Cited

U.S. PATENT DOCUMENTS 3,065,166 A    11/1962   Hennig
3,536,609 A    10/1970   Stine et al.
(Continued)

FOREIGN PATENT DOCUMENTS

CN    1422327 A    6/2003
CN    1423689 A    6/2003
(Continued)

OTHER PUBLICATIONS

Gong, Jianhong et al., "LTAG Technology for Producing High Octane Number Gasoline and Light Aromatics", Petroleum Processing and Petrochemicals, Sep. 2016, vol. 47, No. 9, pp. 1-5 (English abstract on the last page).
(Continued)

*Primary Examiner* — Prem C Singh
*Assistant Examiner* — Brandi M Doyle
(74) *Attorney, Agent, or Firm* — Novick, Kim & Lee, PLLC; Allen Xue

(57) ABSTRACT

A catalytic cracking process includes the following steps: i) subjecting a heavy feedstock oil to flail catalytic cracking; ii) separating the catalytic cracking reaction product obtained from step i) to obtain a catalytic cracking gasoline and a catalytic cracking light cycle oil; iii) splitting the catalytic cracking gasoline to obtain a light gasoline fraction, a
(Continued)

medium gasoline fraction and a heavy gasoline fraction; iv) subjecting the catalytic cracking light cycle oil to hydrogenation to obtain a hydrogenated light cycle oil); v) mixing a portion of the light gasoline fraction with at least a portion of the hydrogenated light cycle oil to obtain a mixed fraction; vi) subjecting the mixed fraction to catalytic cracking; and vii) subjecting a portion of the medium gasoline fraction to flail catalytic cracking. The process is capable of producing more catalytic cracking gasoline, reducing the olefin content of the catalytic cracking gasoline, and increasing its octane number.

18 Claims, 2 Drawing Sheets

(51) Int. Cl.
 C10G 51/02 (2006.01)
 B01J 8/28 (2006.01)
 C10G 11/05 (2006.01)
(52) U.S. Cl.
 CPC .......... *C10G 11/182* (2013.01); *C10G 51/026* (2013.01); *C10G 2300/1088* (2013.01); *C10G 2300/305* (2013.01); *C10G 2400/02* (2013.01)
(58) Field of Classification Search
 CPC ...... C10G 2300/1088; C10G 2300/305; C10G 2400/02
 See application file for complete search history.

(56) References Cited

U.S. PATENT DOCUMENTS

| | | | |
|---|---|---|---|
| 3,928,172 | A | 12/1975 | Davis, Jr. et al. |
| 4,585,545 | A | 4/1986 | Yancey, Jr. et al. |
| 2001/0042700 | A1* | 11/2001 | Swan, III ............... C10G 69/04 208/68 |
| 2011/0056870 | A1 | 3/2011 | Rispoli et al. |
| 2014/0018585 | A1 | 1/2014 | Yanagawa et al. |

FOREIGN PATENT DOCUMENTS

| | | |
|---|---|---|
| CN | 1425054 A | 6/2003 |
| CN | 1466619 A | 1/2004 |
| CN | 101191081 A | 6/2008 |
| CN | 101987972 A | 3/2011 |
| CN | 102186952 A | 9/2011 |
| CN | 104560167 A | 4/2015 |
| CN | 104560166 B | 5/2016 |

OTHER PUBLICATIONS

Cuiding Yang et al., "Petrochemical analysis method: RIPP experiment method", 1990, ISBN: 7-03-001894-X/TE, pp. 208-211, 263-268, 443-445.

* cited by examiner

CATALYTIC CRACKING PROCESS WITH INCREASED PRODUCTION OF A GASOLINE HAVING A LOW OLEFIN CONTENT AND A HIGH OCTANE NUMBER

CROSS REFERENCE TO RELATED APPLICATIONS

The present application claims the priority of the Chinese patent application No. 201710883617.6, filed on Sep. 26, 2017 before the Chinese Patent Office, entitled "Catalytic Cracking Process with Increased Production of a Gasoline Having a Low Olefin Content and a High Octane number", and the priority of the Chinese patent application No. 201710884528.3, filed on Sep. 26, 2017 before the Chinese Patent Office, entitled "Catalytic Cracking Process with a Reduced Diesel-to-gasoline Ratio", the contents of which are incorporated herein by reference in their entirety.

TECHNICAL FIELD

The present application relates to the field of catalytic cracking, and particularly to a catalytic cracking process with increased production of a gasoline having a lower olefin content and a higher octane number.

BACKGROUND ART

With the increased use of heavy crude oils and the rapid growth of demand for light oil products, catalytic cracking techniques for converting heavy oils into light oils have developed rapidly.

However, a fact that must be faced is that catalytic cracking diesel (also referred to as "light cycle oil (LCO)") normally has a relatively poor quality, high density, high aromatics content, and low cetane value. Thus, it is difficult to meet the increasingly stringent diesel specifications, even through diesel hydrotreatment technology. Meanwhile, due to the slow down in economy, a structural surplus of diesel fuel has been encountered. On the other hand, there are more and more private cars fueled by gasoline, and the demand for high-octane gasoline is rising. However, with the increasingly strict environmental regulations, the standard for finished gasoline is also becoming more stringent, which requires the olefin content of gasoline to be further reduced, e.g., to a level less than 15%. Therefore, for oil refining enterprises, it is desirable to significantly reduce the ratio of diesel to gasoline; and for the catalytic cracking units of the enterprises, it is desirable to produce a clean gasoline with low olefin content and high octane number without no or reduced production of light cycle oil.

U.S. Pat. No. 4,585,545 A discloses a catalytic conversion process comprising subjecting a full-range catalytic cracking light cycle oil to a hydrotreatment to obtain a hydrogenated light cycle oil, followed by catalytic cracking to produce a gasoline rich in monocyclic aromatics.

Chinese Patent Application Publication No. CN1422327A discloses a process for the upgrading of a catalytic cracking light cycle oil, comprising subjecting a light cycle oil produced by a first catalytic cracking unit using a heavy oil as a raw material to deep hydrogenation, and then passing the hydrogenated light cycle oil to a second catalytic cracking unit. As developed on the basis of this process, Chinese Patent Application Publication No. CN1423689A further emphasizes that, to selectively increase the yield of light olefins, the catalyst used in the second catalytic cracking unit is required to comprise 50-95% of a shape-selective zeolite and about 5-50% of a macroporous zeolite having a pore diameter of greater than or equal to about 0.7 nm.

Chinese Patent Application Publication No. CN1466619A discloses a process of the conversion of catalytic cracking light cycle oil, in which a catalytic cracking riser reactor is divided into two reaction zones, i.e. a upstream reaction zone and a downstream reaction zone, a heavy oil is sprayed into the downstream reaction zone, the resultant catalytic cracking light cycle oil product is hydrogenated to obtain a hydrogenated light cycle oil, which is then sprayed into the upstream reaction zone. As developed on the basis of this process, Chinese Patent Application Publication No. CN1425054A further adds naphtha to the feed of the upstream reaction zone.

However, existing processes fail to provide a maximum reduction in production of light cycle oil during the heavy oil catalytic cracking process, while increasing the production of gasoline with low olefin content and high octane number.

SUMMARY OF THE INVENTION

In view of the problems existing in the prior arts, it is an object of the present application to provide a novel catalytic cracking process capable of reducing the production of light cycle oil and increasing the production of catalytic cracking gasoline, while reducing the olefin content of the catalytic cracking gasoline and increasing the octane number thereof.

In order to achieve the above object, the present application provides a catalytic cracking process comprising the following steps:

i) subjecting a heavy feedstock oil to a catalytic cracking reaction to obtain a catalytic cracking reaction product;

ii) separating the catalytic cracking reaction product to obtain a catalytic cracking gasoline and a catalytic cracking light cycle oil;

iii) splitting the catalytic cracking gasoline to obtain a light gasoline fraction, a medium gasoline fraction and a heavy gasoline fraction;

iv) subjecting the catalytic cracking light cycle oil to hydrogenation to obtain a hydrogenated light cycle oil;

v) mixing a portion of the light gasoline fraction with at least a portion of the hydrogenated light cycle oil to obtain a mixed fraction;

vi) subjecting the mixed fraction to a catalytic cracking reaction; and vii) subjecting a portion of the medium gasoline fraction to a catalytic cracking reaction.

In a preferred embodiment, the catalytic cracking process of the present application comprises the following steps:

i) spraying the heavy feedstock oil into a riser reactor via a first nozzle, and subjecting it to a catalytic cracking reaction therein to obtain a catalytic cracking reaction product;

ii) separating the catalytic cracking reaction product to obtain a catalytic cracking gasoline and a catalytic cracking light cycle oil;

iii) splitting the catalytic cracking gasoline obtained in step ii) and optionally a catalytic cracking gasoline from an external source to obtain a light gasoline fraction, a medium gasoline fraction and a heavy gasoline fraction;

iv) subjecting the catalytic cracking light cycle oil obtained in step ii) and optionally a catalytic cracking light cycle oil from an external source to a hydrotreatment to obtain a hydrogenated light cycle oil;

v) mixing a portion of the light gasoline fraction obtained in step iii) with at least a portion of the hydrogenated light cycle oil obtained in step iv) to obtain a mixed fraction;

vi) spraying the mixed fraction obtained in step v) into a riser reactor via a second nozzle, and subjecting it to a catalytic cracking reaction therein;

vii) spraying a portion of the medium gasoline fraction obtained in step iii) into a riser reactor via a third nozzle, and subjecting it to a catalytic cracking reaction therein.

In some further preferred embodiments, in steps i), vi) and vii), the heavy feedstock oil, the mixed fraction and the medium gasoline fraction are sprayed into a single riser reactor via the first nozzle, the second nozzle and the third nozzle, respectively, to conduct a catalytic cracking reaction.

In a still further preferred embodiment, the first nozzle is disposed above the second and third nozzles along the height direction of the riser reactor. Particularly preferably, the second nozzle is disposed above the third nozzle.

In some further preferred embodiments, in step i), the heavy feedstock oil is sprayed into a first riser reactor via the first nozzle to conduct a catalytic cracking reaction; and in step vi) and step vii), the mixed fraction and the medium gasoline fraction are sprayed into a second riser reactor via the second nozzle and the third nozzle, respectively, to conduct a catalytic cracking reaction.

In a still further preferred embodiment, the second nozzle is disposed above the third nozzle along the height direction of the second riser reactor.

In another still further preferred embodiment, the second nozzle is disposed below the third nozzle along the height direction of the second riser reactor.

The process of the present application may bring about one or more of the following advantages:

1. by recycling a part of the fractions obtained by splitting the catalytic cracking gasoline together with the hydrogenated light cycle oil to the riser reactor to continue the catalytic cracking reaction, the present application may maximally reduce the ratio of diesel to gasoline (i.e., the ratio of diesel products to gasoline products), and increase the production of clean catalytic cracking gasoline with a low olefin content and a high octane number;

2. by spraying the hydrogenated light cycle oil and the light gasoline fraction through a second nozzle into the bottom of a riser reactor or a separate second riser reactor, a reaction with short contact time may be realized in the present application under more effective conditions, thereby facilitating an efficient conversion of the hydrogenated light cycle oil and the light gasoline fractions;

3. by mixing and recycling the olefin-rich light gasoline fraction and the hydrogenated light cycle oil into the riser reactor, the action of hydrogenated aromatics present in the hydrogenated light cycle oil as a hydrogen donor may be utilized in the present application to moderately promote the hydrogen transfer reaction between the olefin present in the light gasoline fraction and the hydrogen donor, thereby greatly reducing the olefin content; and at the same time, the ring-opening cracking reaction of the hydrogenated aromatics in the hydrogenated light cycle oil may also be enhanced, thereby improving the conversion of the hydrogenated light cycle oil and the selectivity to gasoline; and 4. by spraying the medium gasoline fraction through a third nozzle disposed at a lower position to the bottom of a riser reactor, a reaction with short contact time may be realized in the present application under more severe conditions, thereby substantially increasing the octane number of said gasoline fraction.

Other characteristics and advantages of the present application will be described hereinafter in detail in the Detailed Description section.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

Figure 1:
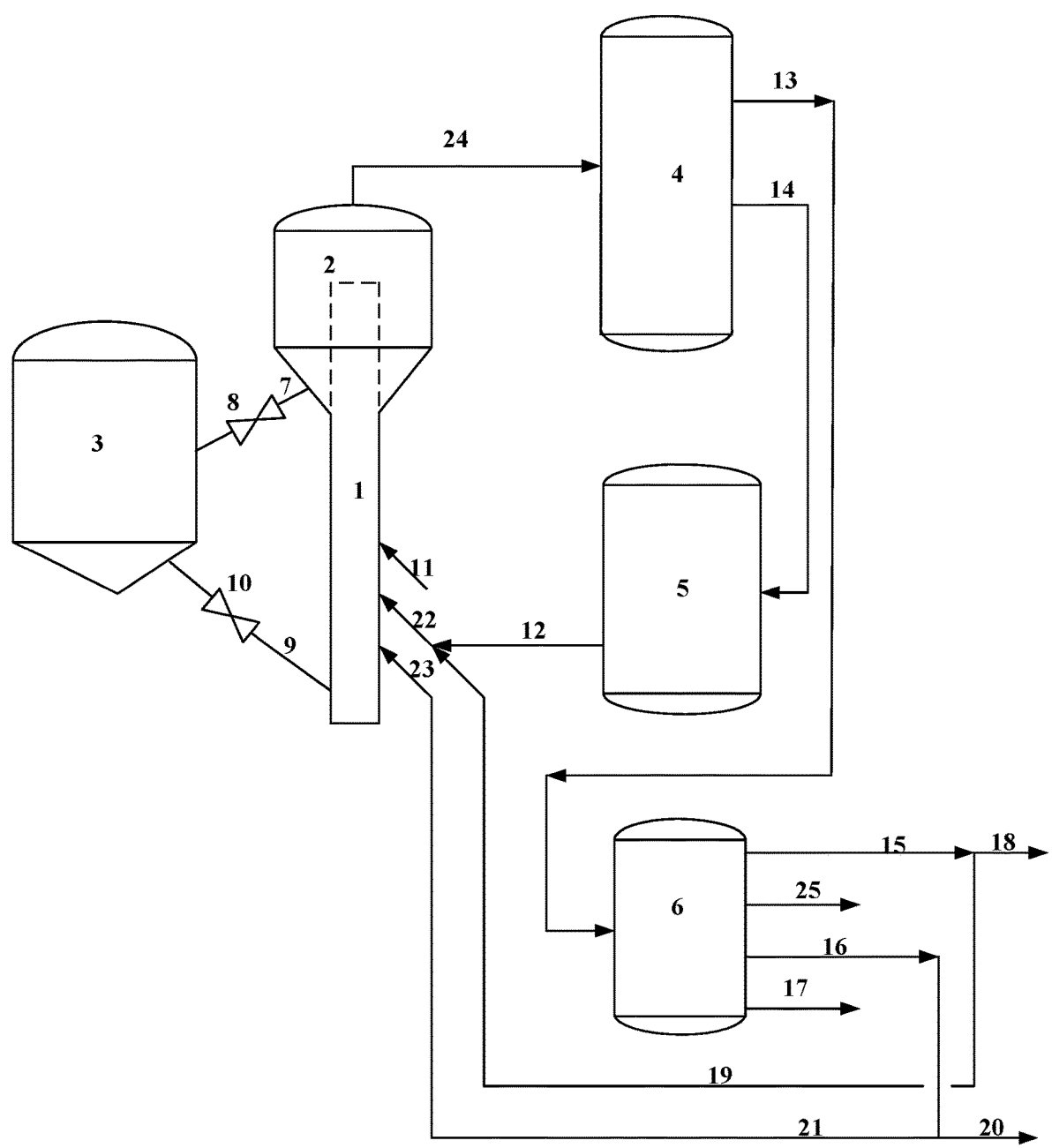
FIG. 1 is a schematic flow diagram of a preferred embodiment of the process according to the present application.

| Description of the reference numerals | |
|---|---|
| 1 First riser reactor | 2 First disengager |
| 3 Regenerator | 4 Main fractionating column |
| 5 Hydrotreating unit | 6 Gasoline fractionating column |
| 7 First spent catalyst sloped tube | 8 Spent catalyst slide valve |
| 9 First regenerated catalyst sloped tube | |
| 10 Regenerated catalyst slide valve | |
| 11 First nozzle | 12 hydrogenated light cycle oil pipeline |
| 13 Gasoline pipeline | 14 Light cycle oil pipeline |
| 15 Light gasoline fraction pipeline | |
| 16 Medium gasoline fraction pipeline | |
| 17 Heavy gasoline fraction pipeline | |
| 18 Light gasoline fraction output pipeline | |
| 19 Light gasoline fraction recycle pipeline | |
| 20 Medium gasoline fraction output pipeline | |
| 21 Medium gasoline fraction recycle pipeline | |
| 22 Second nozzle | 23 Third nozzle |
| 24 Catalytic cracking product pipeline | |
| 25 Residual fraction pipeline | 26 First product pipeline |
| 27 Second riser reactor | 28 Second disengager |
| 29 Second product pipeline | 30 Second spent catalyst sloped tube |
| 31 Second regenerated catalyst sloped tube | |
| 32 Catalyst cooler | |

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

In the context of the present application, the microactivity (MAT) of the catalytic cracking catalyst is determined according to the standard method of RIPP 92-90 (see "Petrochemical Analysis Method (RIPP Test Method)", edited by Cuiding Yang, et. al., Science Press, September 1990, First Version, pages 263-268).

All of the patent and non-patent documents cited herein, including but not limited to textbooks and journal articles, are hereby incorporated by reference in their entirety.

As described above, in order to overcome the problems existing in the prior arts, the present application provides a catalytic cracking process comprising the following steps:

i) subjecting a heavy feedstock oil to a catalytic cracking reaction to obtain a catalytic cracking reaction product;

ii) separating the catalytic cracking reaction product to obtain a catalytic cracking gasoline and a catalytic cracking light cycle oil;

iii) splitting the catalytic cracking gasoline to obtain a light gasoline fraction, a medium gasoline fraction and a heavy gasoline fraction;

iv) subjecting the catalytic cracking light cycle oil to hydrogenation to obtain a hydrogenated light cycle oil;

v) mixing a portion of the light gasoline fraction with at least a portion of the hydrogenated light cycle oil to obtain a mixed fraction;

vi) subjecting the mixed fraction to a catalytic cracking reaction;

vii) subjecting a portion of the medium gasoline fraction to a catalytic cracking reaction.

In a preferred embodiment, the catalytic cracking process of the present application comprises the following steps:

i) spraying the heavy feedstock oil into a riser reactor via a first nozzle, and subjecting it to a catalytic cracking reaction therein to obtain a catalytic cracking reaction product;

ii) separating the catalytic cracking reaction product to obtain a catalytic cracking gasoline and a catalytic cracking light cycle oil;

iii) splitting the catalytic cracking gasoline obtained in step ii) and optionally a catalytic cracking gasoline from an external source to obtain a light gasoline fraction, a medium gasoline fraction and a heavy gasoline fraction;

iv) subjecting the catalytic cracking light cycle oil obtained in step ii) and optionally a catalytic cracking light cycle oil from an external source to a hydrotreatment to obtain a hydrogenated light cycle oil;

v) mixing a portion of the light gasoline fraction obtained in step iii) with at least a portion of the hydrogenated light cycle oil obtained in step iv) to obtain a mixed fraction;

vi) spraying the mixed fraction obtained in step v) into a riser reactor via a second nozzle, and subjecting it to a catalytic cracking reaction therein; and vii) spraying a portion of the medium gasoline fraction obtained in step iii) into a riser reactor via a third nozzle, and subjecting it to a catalytic cracking reaction therein.

In some further preferred embodiments, in steps i), vi) and vii), the heavy feedstock oil, the mixed fraction and the medium gasoline fraction are sprayed into a single riser reactor via the first nozzle, the second nozzle and the third nozzle, respectively, to conduct a catalytic cracking reaction.

In such preferred embodiments, the first nozzle, the second nozzle, and the third nozzle can be disposed in any relative positional relationship, including but not limited to upper-middle-lower, upper-lower-middle, lower-middle-upper, lower-upper-middle, middle-upper-lower and middle-lower-upper. Preferably, along the height direction of the riser reactor, the first nozzle is disposed above the second and third nozzles, and more preferably the second nozzle is disposed above the third nozzle.

In a still further preferred embodiment, the reaction time in the riser reactor section between the second nozzle and the first nozzle is in a range from about 0.01 to about 3 seconds, preferably from about 0.05 to about 2 seconds; and/or the reaction time in the riser reactor section between the third nozzle and the second nozzle is in a range from about 0.01 to about 2 seconds, preferably from about 0.05 to about 1 second.

In some further preferred embodiments, in step i), the heavy feedstock oil is sprayed into a first riser reactor via the first nozzle to conduct a catalytic cracking reaction; and in step vi) and step vii), the mixed fraction and the medium gasoline fraction are sprayed into a second riser reactor via the second nozzle and the third nozzle, respectively, to conduct a catalytic cracking reaction.

In such preferred embodiments, the second nozzle and the third nozzle can also be disposed in any relative positional relationship, such as upper-lower, lower-upper, and the like. Preferably, the second nozzle is disposed above the third nozzle along the height direction of the second riser reactor.

In a still further preferred embodiment, the reaction time in the riser reactor section between the third nozzle and the second nozzle is in a range from about 0.01 to about 2 seconds, preferably from about 0.05 to about 1 second.

According to the present application, the splitting of the catalytic cracking gasoline can be carried out in a manner well known to those skilled in the art. For example, it can be carried out in a fractionating column, and fractions from the top, side and bottom of the fractionating column can be obtained. Preferably, the cut point between the light gasoline fraction and the medium gasoline fraction is between about 60 and about 80° C., and the cut point between the medium gasoline fraction and the heavy gasoline fraction is between about 120 and about 130° C.

In a preferred embodiment, a medium gasoline fraction having a distillation range within a range from about 90 to about 130° C. is subjected to a catalytic cracking reaction in step vii).

In the present application, a part of the gasoline fraction is recycled to the riser reactor to conduct a catalytic cracking reaction, and the remaining gasoline fraction is sent to a gasoline pool as a gasoline component, so that the properties, such as octane number and olefin content, of the gasoline in the gasoline pool can be adjusted.

In a preferred embodiment, about 2% to about 90% by weight, more preferably about 10% to about 80% by weight, of the medium gasoline fraction is subjected to a catalytic cracking reaction in step vii).

In a preferred embodiment, about 2% to about 90% by weight, preferably about 10 to 70% by weight, of the light gasoline fraction is mixed with about 10% to about 100% by weight, preferably about 30% to about 100% by weight, of the hydrogenated light cycle oil in step v) to obtain the mixed fraction.

In a preferred embodiment, the process can further comprise the step of: passing a portion of the light gasoline fraction, a portion of the gasoline fraction, and all of the heavy gasoline fraction to a subsequent absorption-stabilization unit. For example, the remaining portions of the light gasoline fraction and the medium gasoline fraction, and all of the heavy gasoline fraction are sent to the subsequent absorption-stabilization unit.

According to the present application, the hydrotreatment can be carried out in a manner well known to those skilled in the art. For example, the hydrogenation step iv) can be carried out in the presence of a hydrogenation catalyst comprising a support and an active component supported thereon, the active component can be selected from the group consisting of a Group VIB metal, a Group VIII non-noble metal and combinations thereof, the Group VIB metal is preferably molybdenum and/or tungsten, the Group VIII non-noble metal is preferably nickel and/or cobalt, the active component is preferably nickel-tungsten, nickel-tungsten-cobalt, nickel-molybdenum or cobalt-molybdenum, and the support can be selected from the group consisting of alumina, silica, amorphous silica-alumina, and combinations thereof. Preferably, the hydrogenation catalyst comprises from about 70% to about 85% by weight of the support and from about 15% to about 30% by weight of the active component.

In a preferred embodiment, the hydrogenation step iv) is carried out under the following conditions: a reaction temperature ranging from about 330 to about 450° C., preferably from about 340 to about 380° C., a hydrogen partial pressure ranging from about 6 to about 25 MPa, preferably from about 10 to about 22 MPa, a volume space velocity ranging from about 0.1 to about 20 preferably from about 0.1 to about 3.0 and a hydrogen-to-oil volume ratio ranging from about 1000 to about 2000 $Nm^3/m^3$, preferably from about 350 to about 2000 $Nm^3/m^3$.

In some embodiments, during the hydrotreatment of the catalytic cracking light cycle oil, some gases and gasoline fraction may be produced, and thus a separation of the product obtained may be needed to provide a hydrogenated light cycle oil having an initial boiling point greater than about 165° C.

In a preferred embodiment, the hydrogenation step iv) is carried out to an extent that the resultant hydrogenated light cycle oil has a bicyclic aromatics content of no more than about 20% by weight, preferably no more than about 10% by weight, more preferably no more than about 8% by weight, a hydrogen content of no less than about 11% by weight, preferably no less than about 14% by weight, and an initial boiling point of greater than about 165° C., preferably greater than about 175° C.

According to the present application, the catalytic cracking reaction can be carried out using equipment well known to those skilled in the art, for example in a riser reactor. The riser reactor is well known to those skilled in the art and can, for example, be an equal-diameter riser reactor with or without a fluidized bed reactor, or a variable-diameter riser reactor with or without a fluidized bed reactor.

According to the present application, the catalytic cracking reaction can be carried out in a manner well known to those skilled in the art. In some preferred embodiments, the catalytic cracking reactions of steps i), vi) and vii) are carried out in a single riser reactor, and the reaction conditions in the riser reactor are as follows: a reaction temperature ranging from about 480 to about 650° C., preferably from about 490 to about 550° C.; a weight ratio of catalytic cracking catalyst to the heavy feedstock oil ranging from about 2 to about 100, preferably from about 4 to about 50; a reaction time of the heavy feedstock oil ranging from about 1 to about 10 seconds, preferably from about 2 to about 8 seconds; a reaction pressure (absolute pressure) ranging from about 0.15 to about 0.4 MPa; a weight ratio of steam to the heavy feedstock oil ranging from about 0.01 to about 0.5, preferably from about 0.02 to about 0.2, and a micro-activity (MAT) of catalytic cracking catalyst of not less than about 55, preferably not less than about 60, as measured by the test method of RIPP 92-90 in catalytic cracking field for determining the micro-activity of equilibrium catalysts.

In a further preferred embodiment, the catalytic cracking reactions of steps i), vi) and vii) are carried out in the presence of a catalytic cracking catalyst comprising, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite.

In some preferred embodiments, the catalytic cracking reaction of step i) is carried out in a first riser reactor, and the reaction conditions in the first riser reactor are as follows: a reaction temperature ranging from about 480 to about 650° C., preferably from about 490 to 600° C., a catalyst-to-oil ratio ranging from about 2 to about 100, preferably from about 4 to about 50, a reaction time ranging from about 1 to about 10 seconds, preferably from about 2 to about 8 seconds, a reaction pressure (absolute pressure) ranging from about 0.15 to about 0.4 MPa, and a weight ratio of steam to the heavy feedstock oil ranging from about 0.01 to about 0.5, preferably from about 0.02 to about 0.2, a micro-activity (MAT) of catalytic cracking catalyst of not less than about 55, preferably not less than about 60; and the catalytic cracking reactions of steps vi) and vii) are carried out in a second riser reactor, and the reaction conditions in the second riser reactor are as follows: a reaction temperature ranging from about 400 to about 650° C., preferably from about 420 to about 550° C., a catalyst-to-oil ratio (based on the total amount of the feedstock oil) ranging from about 5 to about 100, preferably from about 8 to about 80, a reaction time (timing from the uppermost nozzle) ranging from about 0.01 to 10 seconds, preferably from about 0.05 to 5 seconds, a reaction pressure (absolute pressure) ranging from about 0.15 to about 0.4 MPa, a weight ratio of steam to the total amount of the feedstock oil ranging from about 0.01 to about 0.5, preferably from about 0.02 to about 0.2, and a micro-activity (MAT) of catalytic cracking catalyst of not less than about 55, preferably not less than about 60.

In a further preferred embodiment, the catalytic cracking reaction of step i) is carried out in the presence of a first catalytic cracking catalyst comprising, on a dry basis, about 10% to about 50% by weight of a zeolite, about 5% to about 90% by weight of an inorganic oxide and about 0% to about 70% by weight of a clay, based on the weight of the first catalytic cracking catalyst; the catalytic cracking reactions of steps vi) and vii) are carried out in the presence of a second catalytic cracking catalyst comprising, on a dry basis, about 10% to about 50% by weight of a zeolite, about 5% to about 90% by weight of an inorganic oxide and about 0% to about 70% by weight of a clay, based on the weight of the second catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite. In a specific embodiment, the first catalytic cracking catalyst and the second catalytic cracking catalyst can be the same or different.

In some embodiments of the present application, after the catalytic cracking reaction, the spent catalyst (including the first spent catalyst corresponding to the first catalytic cracking catalyst and the second spent catalyst corresponding to the second catalytic cracking catalyst) is regenerated in a regenerator by burning off the coke to obtain a regenerated catalyst, which is then recycled to the riser reactor as the first catalytic cracking catalyst and the second catalytic cracking catalyst.

In some preferred embodiments, a regenerated catalyst cooled to a temperature between about 500 and about 680° C., preferably between about 550 and about 650° C., is recycled to the riser reactor as the second catalytic cracking catalyst. The cooling can be carried out in a catalyst cooler or an external heat extractor.

In a first kind of particular embodiments, the present application provides a catalytic cracking process for increasing the production of a gasoline with a low olefin content and a high octane number, comprising the following steps:

i) spraying a heavy feedstock oil into a riser reactor via a first nozzle to contact with a catalytic cracking catalyst, and subjecting it to a catalytic cracking reaction to obtain a catalytic cracking reaction product;

ii) separating the catalytic cracking reaction product to obtain at least a catalytic cracking gasoline and a catalytic cracking light cycle oil;

iii) splitting the resultant catalytic cracking gasoline to obtain a light gasoline fraction, a medium gasoline fraction and a heavy gasoline fraction;

iv) bringing the resultant catalytic cracking light cycle oil into contact with a hydrogenation catalyst in a hydrotreating unit, and subjecting it to a hydrotreatment to obtain a hydrogenated light cycle oil;

v) mixing a portion of the light gasoline fraction with at least a portion of the hydrogenated light cycle oil to obtain a mixed fraction;

vi) spraying the mixed fraction into the riser reactor via a second nozzle, and subjecting it to a catalytic cracking reaction; and vii) spraying a portion of the medium gasoline fraction into the riser reactor via a third nozzle, and subjecting it to a catalytic cracking reaction.

Optionally, the process can further comprise: splitting a gasoline produced by an external catalytic cracking unit in step iii) as the catalytic cracking gasoline; and/or, subjecting a light cycle oil produced by an external catalytic cracking unit to a hydrotreatment in step iv) as the catalytic cracking light cycle oil, so that the utilization rate of light cycle oil and catalytic cracking gasoline can be further improved.

Preferably, the cut point between the light gasoline fraction and the medium gasoline fraction is between about 60 and about 80° C., and the cut point between the medium gasoline fraction and the heavy gasoline fraction is between about 120 and about 130° C.

Preferably, a medium gasoline fraction having a distillation range within a range from about 90 to about 130° C. is sprayed into the riser reactor, and subjected to a catalytic cracking reaction in step vii).

Preferably, about 2% to about 90% by weight, more preferably about 10% to about 80% by weight, of the medium gasoline fraction is sprayed into the riser reactor, and subjected to a catalytic cracking reaction in step vii).

Preferably, about 2% to about 90% by weight, more preferably about 10 to 70% by weight, of the light gasoline fraction is mixed with about 10% to about 100% by weight, more preferably about 30% to about 100% by weight, of the hydrogenated light cycle oil in step v) to obtain the mixed fraction.

Preferably, the process can further comprise the step of: passing the remaining portions of the light gasoline fraction and the medium gasoline fraction, and all of the heavy gasoline fraction to a subsequent absorption-stabilization unit.

Preferably, the hydrotreatment is carried out under the following conditions: a reaction temperature ranging from about 330 to about 450° C., preferably from about 340 to about 380° C., a hydrogen partial pressure ranging from about 6 to about 25 MPa, preferably from about 10 to about 22 MPa, a volume space velocity ranging from about 0.1 to about 20 h$^{-1}$, preferably from about 0.1 to about 3.0 h$^{-1}$, and a hydrogen-to-oil volume ratio ranging from about 1000 to about 2000 Nm$^3$/m$^3$, preferably from about 350 to about 2000 Nm$^3$/m$^3$.

Preferably, the hydrogenation catalyst comprises a carrier and an active component supported thereon, the active component can be selected from the group consisting of a Group VIB metal, a Group VIII non-noble metal, and combinations thereof, the Group VIB metal is preferably molybdenum and/or tungsten, the Group VIII non-noble metal is preferably nickel and/or cobalt, and the active component is preferably nickel-tungsten, nickel-tungsten-cobalt, nickel-molybdenum or cobalt-molybdenum, and the support is selected from the group consisting of alumina, silica, amorphous silica-alumina, and combinations thereof. More preferably, the hydrogenation catalyst comprises from about 70% to about 85% by weight of the support and from about 15% to about 30% by weight of the active component.

Preferably, the hydrogenation step iv) is carried out to an extent that the resultant hydrogenated light cycle oil has a bicyclic aromatics content of no more than about 20% by weight, preferably no more than about 10% by weight, more preferably no more than about 8% by weight, a hydrogen content of no less than about 11% by weight, preferably no less than about 14% by weight, and an initial boiling point of greater than about 165° C., preferably greater than about 175° C.

In some particular embodiments, the riser reactor is an equal-diameter riser reactor with or without a fluidized bed reactor, or a variable-diameter riser reactor with or without a fluidized bed reactor.

Preferably, the first nozzle, the second nozzle, and the third nozzle are spaced apart from each other from up to down. More preferably, the reaction time in the riser reactor section between the third nozzle and the second nozzle is in a range from about 0.01 to about 2 seconds, and the reaction time in the riser reactor section between the second nozzle and the first nozzle is in a range from about 0.01 to about 3 seconds. Further preferably, the reaction time in the riser reactor section between the third nozzle and the second nozzle is in a range from about 0.05 to about 1 second, and the reaction time in the riser reactor section between the second nozzle and the first nozzle is in a range from about 0.05 to about 2 seconds.

Preferably, the reaction conditions in the riser reactor are as follows: a reaction temperature ranging from about 480 to about 650° C., preferably from about 490 to about 550° C.; a weight ratio of catalytic cracking catalyst to the heavy feedstock oil ranging from about 2 to about 100, preferably from about 4 to about 50; a reaction time of the heavy feedstock oil ranging from about 1 to about 10 seconds, preferably from about 2 to about 8 seconds; a reaction pressure (absolute pressure) ranging from about 0.15 to about 0.4 MPa; a weight ratio of steam to the heavy feedstock oil ranging from about 0.01 to about 0.5, preferably from about 0.02 to about 0.2, and a micro-activity (MAT) of catalytic cracking catalyst of not less than about 55, preferably not less than about 60, as measured by the test method of RIPP 92-90 in catalytic cracking field for determining the micro-activity of equilibrium catalysts.

Preferably, the catalytic cracking catalyst comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite.

Such kind of particular embodiments of the present application may bring about one or more of the following advantages:

1. by recycling a part of the fractions obtained by splitting the catalytic cracking gasoline together with the hydrogenated light cycle oil to the riser reactor to continue the catalytic cracking reaction, the present application may substantially reduce the ratio of diesel to gasoline, and increase the production of clean catalytic cracking gasoline with a low olefin content and a high octane number;

2. by spraying the medium gasoline fraction through a third nozzle disposed at a lower position into the bottom of the riser reactor, a reaction with short contact time may be realized in the present application under more severe conditions, thereby substantially increasing the octane number of said gasoline fraction;

3. by mixing and recycling the olefin-rich light gasoline fraction and the hydrogenated light cycle oil to the riser reactor via a separate second nozzle disposed at a middle position, a reaction with short contact time may be realized in the present application at the bottom of the riser reactor under relatively severe conditions; the action of hydrogenated aromatics present in the hydrogenated light cycle oil as a hydrogen donor may be utilized to moderately promote the hydrogen transfer reaction between the olefin present in the light gasoline fraction and the hydrogen donor, thereby greatly reducing the olefin content; and at the same time, the ring-opening cracking reaction of the hydrogenated aromatics in the hydrogenated light cycle oil may also be enhanced, thereby improving the conversion of the hydrogenated light cycle oil and the selectivity to gasoline; and 4. by optimizing the reaction time in the riser reactor section between the third nozzle at the lower position and the second nozzle at the middle position and the outlet temperature of the riser reactor, there is no negative impact on the conversion of the heavy feedstock sprayed through the first nozzle at the upper position, but instead, the heavy oil conversion capacity may be improved by raising the catalyst-to-oil ratio.

The first kind of particular embodiments of the present application will be further described below with reference to the accompanying drawings, but are not intended to limit the present application.

As shown in FIG. 1, a fresh heavy feedstock oil is sprayed into a first riser reactor 1 via a first nozzle 11, and subjected to a catalytic cracking reaction to obtain a catalytic cracking product and a spent catalyst, which are sent to a first disengager 2 for separation by sedimentation. After the separation in the first disengager 2, the catalytic cracking product is sent to a main fractionating column 4 via a catalytic cracking product pipeline 24 for fractional distillation to obtain a catalytic cracking gasoline and a catalytic cracking light cycle oil. After being stripped, the spent catalyst is sent to a regenerator 3 through a first spent catalyst sloped tube 7 and a spent catalyst slide valve 8 for regeneration by burning off the coke to obtain a regenerated catalyst. The catalytic cracking gasoline from the main fractionating column 4 is sent to a gasoline fractionating column 6 through a gasoline pipeline 13 for splitting, the resultant light gasoline fraction is withdrawn through a light gasoline fraction pipeline 15, the resultant medium gasoline fraction is withdrawn through a medium gasoline fraction pipeline 16, and the resultant heavy gasoline fraction is withdrawn through a heavy gasoline fraction pipeline 17 and sent to a subsequent absorption-stabilization unit (not shown). Gasoline fractions other than the light gasoline fraction, the medium gasoline fraction and the heavy gasoline fraction are withdrawn from a residual fraction pipeline 25 and also sent to the subsequent absorption-stabilization unit. A portion of the light gasoline fraction from the light gasoline fraction pipeline 15 is taken out through a light gasoline fraction output pipeline 18 and sent to the subsequent absorption-stabilization unit, and the other portion is recycled to the first riser reactor 1 via a light gasoline fraction recycle pipeline 19; a portion of the medium gasoline fraction from the medium gasoline fraction pipeline 16 is taken out through a medium gasoline fraction output pipeline 20 and sent to the subsequent absorption-stabilization unit, and the other portion is recycled through a medium gasoline fraction recycle pipeline 21 and sprayed into the first riser reactor 1 via a third nozzle 23. The catalytic cracking light cycle oil is withdrawn from the main fractionating column 4 through a light cycle oil pipeline 14 and sent to a hydrotreating unit 5, and the resultant hydrogenated light cycle oil is withdrawn through a hydrogenated light cycle oil pipeline 12, mixed with the light gasoline fraction from the light gasoline fraction recycle pipeline 19, and then sprayed into the first riser reactor 1 through a second nozzle 22. The first nozzle 11, the second nozzle 22, and the third nozzle 23 are disposed in a relative positional relationship of upper-middle-lower, along the height direction of the first riser reactor 1. In the first riser reactor 1, the medium gasoline fraction, the light gasoline fraction, the hydrogenated light cycle oil, and the heavy feedstock oil are contacted with the regenerated catalyst come from the regenerator 3 through a first regenerated catalyst sloped tube 9 and a regenerated catalyst slide valve 10, and upraised, to conduct the catalytic cracking reaction, producing the catalytic cracking product and the spent catalyst, which are sent to the first disengager 2 for separation by sedimentation.

In a second kind of particular embodiments, the present application provides a catalytic cracking process with a reduced diesel-to-gasoline ratio, comprising the following steps:

i) spraying a heavy feedstock oil into a first riser reactor via a first nozzle to contact with a first catalytic cracking catalyst, and subjecting it a catalytic cracking reaction to obtain a first reaction product;

ii) separating the first reaction product to obtain at least a first catalytic cracking gasoline and a first catalytic cracking light cycle oil;

iii) splitting the resultant first catalytic cracking gasoline to obtain a light gasoline fraction, a medium gasoline fraction and a heavy gasoline fraction;

iv) bringing the resultant first catalytic cracking light cycle oil into contact with a hydrogenation catalyst in a hydrotreating unit, and subjecting it to a hydrotreatment to obtain a hydrogenated light cycle oil;

v) mixing a portion of the light gasoline fraction with at least a portion of the hydrogenated light cycle oil to obtain a mixed fraction;

vi) spraying the mixed fraction into a second riser reactor via a second nozzle to contact with a second catalytic cracking catalyst, and subjecting it to a catalytic cracking reaction; and vii) spraying a portion of the medium gasoline fraction into the second riser reactor via a third nozzle to contact with the second catalytic cracking catalyst, and subjecting it to a catalytic cracking reaction.

In some preferred embodiments, a second reaction product obtained from the second riser reactor is separated in step ii) together with the first reaction product from the first riser reactor.

In some other preferred embodiments, the second reaction product obtained from the second riser reactor is separated independently from the first reaction product to obtain a second catalytic cracking gasoline and a second catalytic cracking light cycle oil.

Optionally, the process can further comprise: splitting a gasoline produced by an external catalytic cracking unit and/or the second catalytic cracking gasoline in step iii) together with the first catalytic cracking gasoline; and/or, subjecting a light cycle oil produced by an external catalytic cracking unit and/or the second catalytic cracking light cycle oil to a hydrotreatment in step iv) together with the first catalytic cracking light cycle oil, so that the utilization rate of light cycle oil can be further improved, the octane number of the gasoline can be increased and the olefin content of the gasoline can be reduced.

Preferably, the cut point between the light gasoline fraction and the medium gasoline fraction is between about 60 and about 80° C., and the cut point between the medium gasoline fraction and the heavy gasoline fraction is between about 120 and about 130° C.

Preferably, a medium gasoline fraction having a distillation range within a range from about 90 to about 130° C. is sprayed into the second riser reactor, and subjected to a catalytic cracking reaction in step vii).

Preferably, about 2% to about 90% by weight, more preferably about 10% to about 80% by weight, of the medium gasoline fraction is sprayed into the second riser reactor, and subjected to a catalytic cracking reaction in step vii).

Preferably, about 2% to about 90% by weight, more preferably about 10 to 70% by weight, of the light gasoline fraction is mixed with about 10% to about 100% by weight, more preferably about 30% to about 100% by weight, of the hydrogenated light cycle oil in step v) to obtain the mixed fraction.

Preferably, the process can further comprise the step of: passing the remaining portions of the light gasoline fraction and the medium gasoline fraction, and all of the heavy gasoline fraction to a subsequent absorption-stabilization unit.

Preferably, the hydrotreatment is carried out under the following conditions: a reaction temperature ranging from about 330 to about 450° C., preferably from about 340 to about 380° C., a hydrogen partial pressure ranging from about 6 to about 25 MPa, preferably from about 10 to about 22 MPa, a volume space velocity ranging from about 0.1 to about 20 h$^{-1}$, preferably from about 0.1 to about 3.0 h$^{-1}$, and a hydrogen-to-oil volume ratio ranging from about 1000 to about 2000 Nm$^3$/m$^3$, preferably from about 350 to about 2000 Nm$^3$/m$^3$.

Preferably, the hydrogenation catalyst comprises a carrier and an active component supported thereon, the active component can be selected from the group consisting of a Group VIB metal, a Group VIII non-noble metal, and combinations thereof, the Group VIB metal is preferably molybdenum and/or tungsten, the Group VIII non-noble metal is preferably nickel and/or cobalt, and the active component is preferably nickel-tungsten, nickel-tungsten-cobalt, nickel-molybdenum or cobalt-molybdenum, and the support is selected from the group consisting of alumina, silica, amorphous silica-alumina, and combinations thereof. More preferably, the hydrogenation catalyst comprises from about 70% to about 85% by weight of the support and from about 15% to about 30% by weight of the active component.

Preferably, the hydrogenation step iv) is carried out to an extent that the resultant hydrogenated light cycle oil has a bicyclic aromatics content of no more than about 20% by weight, preferably no more than about 10% by weight, more preferably no more than about 8% by weight, a hydrogen content of no less than about 11% by weight, preferably no less than about 14% by weight, and an initial boiling point of greater than about 165° C., preferably greater than about 175° C.

In some particular embodiments, the first riser reactor and the second riser reactor are each independently an equal-diameter riser reactor with or without a fluidized bed reactor, or a variable-diameter riser reactor with or without a fluidized bed reactor. The first riser reactor and the second riser reactor can be riser reactors of two separate catalytic cracking units, or can be parallel double riser reactors in a single catalytic cracking unit.

Preferably, the second nozzle and the third nozzle are spaced apart from each other from up to down, and the third nozzle is disposed below the second nozzle. More preferably, the reaction time in the riser reactor section between the third nozzle and the second nozzle is in a range from about 0.01 to about 2 seconds, more preferably from about 0.05 to about 1 second.

Preferably, the reaction conditions in the first riser reactor are as follows: a reaction temperature ranging from about 480 to about 650° C., preferably from about 490 to 600° C., a catalyst-to-oil ratio ranging from about 2 to about 100, preferably from about 4 to about 50, a reaction time ranging from about 1 to about 10 seconds, preferably from about 2 to about 8 seconds, a reaction pressure (absolute pressure) ranging from about 0.15 to about 0.4 MPa, and a weight ratio of steam to the heavy feedstock oil ranging from about 0.01 to about 0.5, preferably from about 0.02 to about 0.2, a micro-activity (MAT) of catalytic cracking catalyst of not less than about 55, preferably not less than about 60, as measured by the test method of RIPP 92-90 in catalytic cracking field for determining the micro-activity of equilibrium catalysts; and the reaction conditions in the second riser reactor are as follows: a reaction temperature ranging from about 400 to about 650° C., preferably from about 420 to about 550° C., a catalyst-to-oil ratio ranging from about 5 to about 100, preferably from about 8 to about 80, a reaction time (timing from the uppermost nozzle) ranging from about 0.01 to 10 seconds, preferably from about 0.05 to 5 seconds, a reaction pressure (absolute pressure) ranging from about 0.15 to about 0.4 MPa, a weight ratio of steam to the total amount of the feedstock oil ranging from about 0.01 to about 0.5, preferably from about 0.02 to about 0.2, and a micro-activity (MAT) of catalytic cracking catalyst of not less than about 55, preferably not less than about 60.

Preferably, the first catalytic cracking catalyst comprises, on a dry basis, about 10% to about 50% by weight of a zeolite, about 5% to about 90% by weight of an inorganic oxide and about 0% to about 70% by weight of a clay, based on the weight of the first catalytic cracking catalyst; the second catalytic cracking catalyst comprises, on a dry basis, about 10% to about 50% by weight of a zeolite, about 5% to about 90% by weight of an inorganic oxide and about 0% to about 70% by weight of a clay, based on the weight of the second catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite. In a particular embodiment, the first catalytic cracking catalyst and the second catalytic cracking catalyst can be the same or different.

In some embodiments, the regenerated catalyst from the regenerator is recycled directly to the first riser reactor and the second riser reactor as the first catalytic cracking catalyst and the second catalytic cracking catalyst, respectively.

In some preferred embodiments, the regenerated catalyst from the regenerator is cooled to a temperature between about 500 and about 680° C., preferably between about 550 and about 650° C., and then recycled to the second riser reactor as the second catalytic cracking catalyst. The cooling can be carried out in a catalyst cooler or an external heat extractor.

Such kind of particular embodiments of the present application may bring about one or more of the following advantages:

1. by recycling a part of the fractions obtained by splitting the catalytic cracking gasoline together with the hydrogenated light cycle oil to the second riser reactor to continue the catalytic cracking reaction, the present application may substantially reduce the ratio of diesel to gasoline, and increase the production of clean catalytic cracking gasoline with a low olefin content and a high octane number;

2. by spraying the hydrogenated light cycle oil and a part of the gasoline fractions into a separate second riser reactor, the catalytic cracking reaction may be carried out under optimized reaction conditions, thereby facilitating an efficient conversion of the hydrogenated light cycle oil and the gasoline fractions;

3. by spraying the medium gasoline fraction through a third nozzle disposed at a lower position to the bottom of the second riser reactor, a reaction with short contact time may be realized in the present application under more severe conditions, thereby substantially increasing the octane number of said gasoline fraction; and 4. by mixing and recycling the olefin-rich light gasoline fraction and the hydrogenated light cycle oil into the second riser reactor via a separate second nozzle, a reaction with short contact time may be realized in the present application at the bottom of the second riser reactor under relatively severe conditions; the action of hydrogenated aromatics present in the hydrogenated light cycle oil as a hydrogen donor may be utilized to moderately promote the hydrogen transfer reaction between the olefin present in the light gasoline fraction and the hydrogen donor, thereby greatly reducing the olefin content; and at the same time, the ring-opening cracking reaction of the hydrogenated aromatics in the hydrogenated light cycle oil may also be enhanced, thereby improving the conversion of the hydrogenated light cycle oil and the selectivity to gasoline.

The second kind of particular embodiments of the present application will be further described below with reference to the accompanying drawings, but are not intended to limit the present application.

Figure 2:
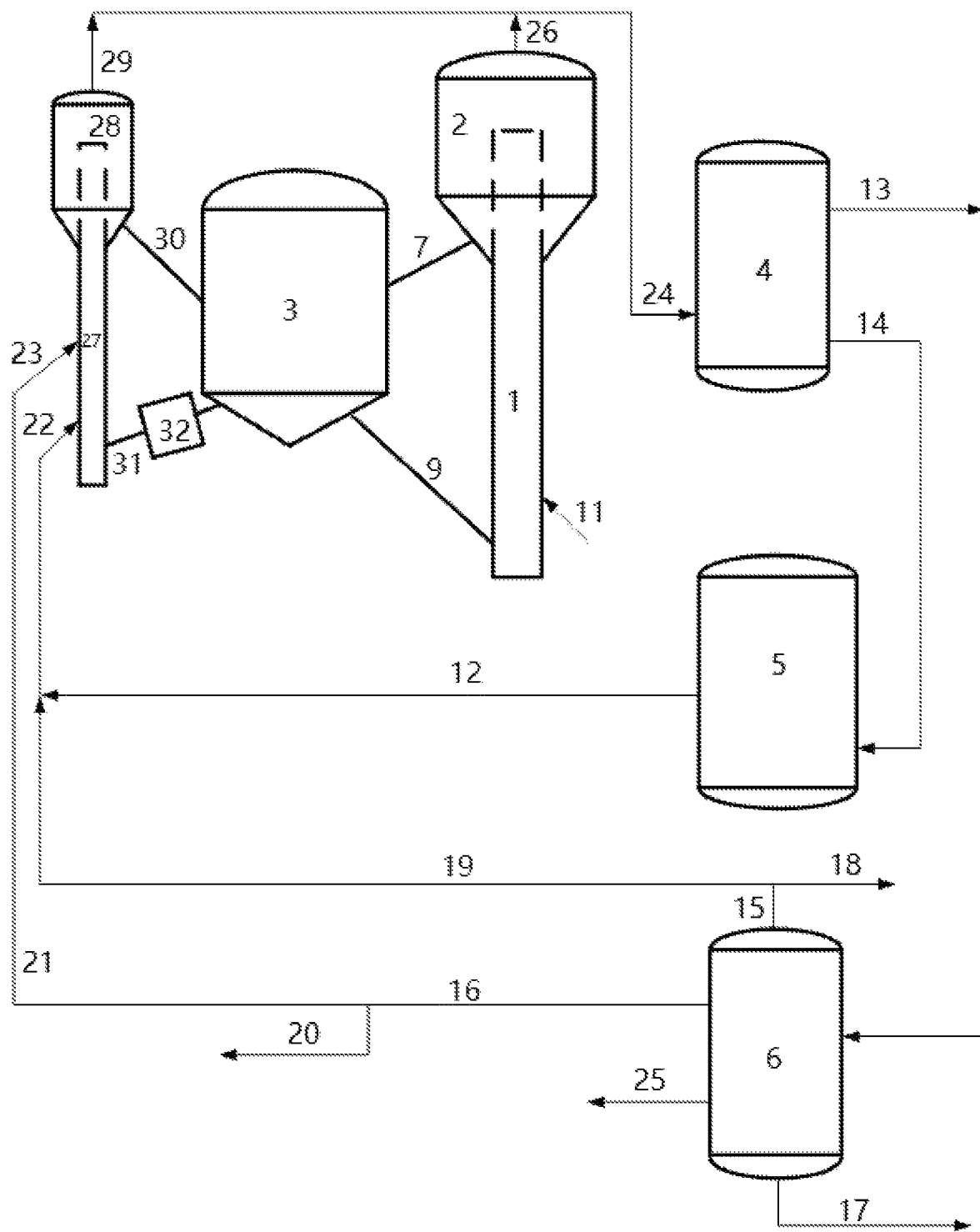
FIG. 2 is a schematic flow diagram of another preferred embodiment of the process according the present application.

As shown in FIG. 2, a fresh heavy feedstock oil is sprayed into a first riser reactor 1 via a first nozzle 11, contacted with a regenerated catalyst having a relatively higher temperature from a first regenerated catalyst sloped tube 9 and upraised, to conduct a catalytic cracking reaction, producing a first reaction product and a first spent catalyst, which are sent to a first disengager 2 for separation by sedimentation. After the separation in the first disengager 2, the first reaction product is withdrawn through a first product pipeline 26, and, after being stripped, the first spent catalyst is sent to a regenerator 3 through a first spent catalyst sloped tube 7 for regeneration, the resultant regenerated catalyst is recycled to the first riser reactor 1 through a first regenerated catalyst sloped tube 9 for reuse. The first reaction product from the first product pipeline 26 is sent to a main fractionating column 4 via a catalytic cracking product pipeline 24 for fractional distillation to obtain a catalytic cracking gasoline and a catalytic cracking light cycle oil. The catalytic cracking gasoline from the main fractionating column 4 is sent to a gasoline fractionating column 6 through a gasoline pipeline 13 for splitting, the resultant light gasoline fraction is withdrawn through a light gasoline fraction pipeline 15, the resultant medium gasoline fraction is withdrawn through a medium gasoline fraction pipeline 16, and the resultant heavy gasoline fraction is withdrawn through a heavy gasoline fraction pipeline 17 and sent to a subsequent absorption-stabilization unit (not shown). Gasoline fractions other than the light gasoline fraction, the medium gasoline fraction and the heavy gasoline fraction are withdrawn from a residual fraction pipeline 25 and also sent to the subsequent absorption-stabilization unit. A portion of the light gasoline fraction from the light gasoline fraction pipeline 15 is taken out through a light gasoline fraction output pipeline 18 and sent to the subsequent absorption-stabilization unit, and the other portion is recycled to a second riser reactor 27 via a light gasoline fraction recycle pipeline 19; a portion of the medium gasoline fraction from the medium gasoline fraction pipeline 16 is taken out through a medium gasoline fraction output pipeline 20 and sent to the subsequent absorption-stabilization unit, and the other portion is recycled through a medium gasoline fraction recycle pipeline 21 and sprayed into the second riser reactor 27 via a third nozzle 23. The catalytic cracking light cycle oil is withdrawn from the main fractionating column 4 through a light cycle oil pipeline 14 and sent to a hydrotreating unit 5, and the resultant hydrogenated light cycle oil is withdrawn through a hydrolight cycle oil pipeline 12, mixed with the light gasoline fraction from the light gasoline fraction recycle pipeline 19, and then sprayed into the second riser reactor 27 through a second nozzle 22. The second nozzle 22 and the third nozzle 23 are disposed in a relative positional relationship of upper-lower, along the height direction of the second riser reactor 27. In the second riser reactor 27, the medium gasoline fraction, the light gasoline fraction, and the hydrogenated light cycle oil are contacted with the regenerated catalyst come from the regenerator 3 through a second regenerated catalyst sloped tube 31 and cooled to a relatively lower temperature in a catalyst cooler 32, and upraised, to conduct a catalytic cracking reaction, producing a second reaction product and a second spent catalyst, which are sent to a second disengager 28 for separation by sedimentation. After the separation in the second disengager 28, the second reaction product is withdrawn through a second product pipeline 29, and, after being stripped, the second spent catalyst is sent to the regenerator 3 through a second spent catalyst sloped tube 30 for regeneration, the resultant regenerated catalyst is send to the catalyst cooler 32 through the second regenerated catalyst sloped tube 31, and then recycled, after being cooled, to the second riser reactor 27 for reuse. The second reaction product from the second product pipeline 29 is combined with the reaction product from the first product pipeline 26 and sent to the main fractionating column 4 via the catalytic cracking product pipeline 24. The catalytic cracking gasoline and the catalytic cracking light cycle oil from the main fractionating column 4 are recycled through the gasoline pipeline 13 and the light cycle oil pipeline 14, respectively.

In some preferred embodiments, the present application provides the following technical solutions:

A1. A catalytic cracking process for increasing the production of a gasoline with a low olefin content and a high octane number, comprising:

spraying a heavy feedstock oil into a riser reactor via a first nozzle to contact with a catalytic cracking catalyst injected below, and subjecting it to a catalytic cracking reaction while moving from bottom to top, to obtain a catalytic cracking reaction product and a spent catalyst;

separating the catalytic cracking reaction product to obtain at least a catalytic cracking gasoline and a catalytic cracking light cycle oil, sending the spent catalyst to a regenerator for regeneration by burning off the coke, and recycling the resultant regenerated catalyst to the riser reactor as the catalytic cracking catalyst;

splitting the resultant catalytic cracking gasoline to obtain a light gasoline fraction, a medium gasoline fraction and a heavy gasoline fraction;

bringing the resultant catalytic cracking light cycle oil into contact with a hydrogenation catalyst in a hydrotreating unit, and subjecting it to a hydrotreatment to obtain a hydrogenated light cycle oil;

mixing a portion of the light gasoline fraction with at least a portion of the hydrogenated light cycle oil to obtain a mixed fraction; and spraying the mixed fraction and a portion of the medium gasoline fraction into the riser reactor via a second nozzle and a third nozzle, respectively, and subjecting them to a catalytic cracking reaction.

A2. The process according to Item A1, further comprising: performing the splitting of the catalytic cracking gasoline by using a gasoline produced by an external catalytic cracking unit as the catalytic cracking gasoline; and/or performing the hydrotreatment of the catalytic cracking light cycle oil by using a light cycle oil produced by an external catalytic cracking unit as the catalytic cracking light cycle oil.

A3. The process according to Item A1, wherein the cut point between the light gasoline fraction and the medium gasoline fraction is between about 60 and about 80° C., and the cut point between the medium gasoline fraction and the heavy gasoline fraction is between about 120 and about 130° C.

A4. The process according to Item A3, wherein a medium gasoline fraction having a distillation range within a range from about 90 to about 130° C. is sprayed into the riser reactor and subjected to a catalytic cracking reaction.

A5. The process according to Item A1, further comprising: passing a portion of the light gasoline fraction, a portion of the gasoline fraction, and all of the heavy gasoline fraction to a subsequent absorption-stabilization unit.

A6. The process according to Item A1, wherein about 2% to about 90% by weight of the medium gasoline fraction is sprayed into the riser reactor.

A7. The process according to Item A1, wherein a mixed fraction obtained by mixing about 2% to about 90% by weight of the light gasoline fraction with about 10% to about 100% by weight of the hydrogenated light cycle oil is sprayed into the riser reactor.

A8. The process according to Item A1, wherein the hydrotreatment is carried out under the following conditions: a reaction temperature ranging from about 330 to about 450° C., a hydrogen partial pressure ranging from about 6 to about 25 MPa, a volume space velocity of about 0.1 to about 2 $h^{-1}$, and a hydrogen-to-oil volume ratio ranging from about 1000 to about 2000 $Nm^3/m^3$.

A9. The process according to Item A1, wherein the hydrogenation catalyst comprises a carrier and an active component supported thereon, the active component is at least one selected from the group consisting of Group VIB metals and Group VIII non-noble metals, and the carriers is at least one selected from the group consisting of alumina, silica, and amorphous silica-alumina.

A10. The process according to Item A1, wherein the hydrogenated light cycle oil has a bicyclic aromatics content of no more than about 10% by weight, and an initial boiling point of greater than about 165° C.

A11. The process according to Item A1, wherein the riser reactor is an equal-diameter riser reactor with or without a fluidized bed reactor, or a variable-diameter riser reactor with or without a fluidized bed reactor.

A12. The process according to Item A1, wherein the first nozzle, the second nozzle, and the third nozzle are spaced apart from each other from up to down.

A13. The process according to Item A12, wherein the reaction time in the riser reactor section between the third nozzle and the second nozzle is between about 0.01 and about 2 seconds, and the reaction time in the riser reactor section between the second nozzle and the first nozzle is between about 0.01 and about 3 seconds.

A14. The process according to Item A12, wherein the reaction time in the riser reactor section between the third nozzle and the second nozzle is between about 0.05 and about 1 second, and the reaction time in the riser reactor section between the second nozzle and the first nozzle is between about 0.05 and about 2 seconds.

A15. The process according to Item A1, wherein the conditions of the catalytic cracking reaction include: a reaction temperature ranging from about 480 to about 650° C., a weight ratio of catalytic cracking catalyst to the heavy feedstock oil of about 2-100, a reaction time of the heavy feedstock oil ranging from about 1 to about 10 seconds, a reaction pressure ranging from about 0.15 to about 0.4 MPa, a weight ratio of steam to the heavy feedstock oil ranging from about 0.01 to about 0.5, and a micro-activity of catalytic cracking catalyst of not less than about 55, as measured by the test method of RIPP 92-90 in catalytic cracking field for determining the micro-activity of equilibrium catalysts.

A16. The process according to Item A1, wherein the catalytic cracking catalyst comprises, on a dry basis, about 10% to about 50% by weight of a zeolite, about 5% to about 90% by weight of an inorganic oxide and about 0% to about 70% by weight of a clay, based on the weight of the catalytic cracking catalyst; and the zeolite is at least one selected from the group consisting of a Y zeolite with or without a rare earth element, an HY zeolite with or without a rare earth element, a USY zeolite with or without a rare earth element, and a Beta zeolite with or without a rare earth element.

B1. A catalytic cracking process with a reduced diesel-to-gasoline ratio, comprising: spraying a heavy feedstock oil into a first riser reactor to contact with a first catalytic cracking catalyst, and subjecting it to a catalytic cracking reaction, to obtain a first reaction product and a first spent catalyst;
separating the first reaction product to obtain at least a first catalytic cracking gasoline and a first catalytic cracking light cycle oil;
splitting the resultant first catalytic cracking gasoline to obtain a light gasoline fraction, a medium gasoline fraction and a heavy gasoline fraction;
bringing the resultant first catalytic cracking light cycle oil into contact with a hydrogenation catalyst in a hydrotreating unit, and subjecting it to a hydrotreatment to obtain a hydrogenated light cycle oil;
mixing a portion of the light gasoline fraction with at least a portion of the hydrogenated light cycle oil to obtain a mixed fraction;
spraying the mixed fraction and a portion of the medium gasoline fraction into a second riser reactor via a first nozzle and a second nozzle, respectively, to contact with a second catalytic cracking catalyst injected below, and subjecting them to a second catalytic cracking reaction while moving from bottom to top, to obtain a second reaction product and a second spent catalyst; separating the second reaction product to obtain at least a second catalytic cracking gasoline and a second catalytic cracking light cycle oil; and recycling a regenerated catalyst obtained by regenerating the first spent catalyst and the second spent catalyst to the first riser reactor and the second riser reactor as the first catalytic cracking catalyst and the second catalytic cracking catalyst, respectively.

B2. The process according to Item B1, further comprising: splitting the first catalytic cracking gasoline together with a gasoline produced by an external catalytic cracking unit and/or the second catalytic cracking gasoline; and/or
subjecting the first catalytic cracking light cycle oil to a hydrotreatment together with a light cycle oil produced by an external catalytic cracking unit and/or the second catalytic cracking light cycle oil.

B3. The process according to Item B1, wherein the cut point between the light gasoline fraction and the medium gasoline fraction is between about 60 and about 80° C., and the cut point between the medium gasoline fraction and the heavy gasoline fraction is between about 120 and about 130° C.

B4. The process according to Item B3, wherein a medium gasoline fraction having a distillation range within a range from about 90 to about 130° C. is sprayed into the riser reactor and subjected to the second catalytic cracking reaction.

B5. The process according to Item B1, further comprising: passing a portion of the light gasoline fraction, a portion of the gasoline fraction, and all of the heavy gasoline fraction to a subsequent absorption-stabilization unit.

B6. The process according to Item B1, wherein about 0% to about 90% by weight of the medium gasoline fraction is sprayed into the second riser reactor.

B7. The process according to Item B1, wherein a mixed fraction obtained by mixing about 0% to about 90% by weight of the light gasoline fraction with about 10% to about 100% by weight of the hydrogenated light cycle oil is sprayed into the second riser reactor.

B8. The process according to Item B1, wherein the hydrotreatment is carried out under the following conditions: a reaction temperature ranging from about 330 to about 450° C., a hydrogen partial pressure ranging from about 6 to about 25 MPa, a volume space velocity of about 0.1 to about 2 $h^{-1}$, and a hydrogen-to-oil volume ratio ranging from about 1000 to about 2000 $Nm^3/m^3$.

B9. The process according to Item B1, wherein the hydrogenation catalyst comprises a carrier and an active component supported thereon, the active component is at least one selected from the group consisting of Group VIB metals and Group VIII non-noble metals, and the carriers is at least one selected from the group consisting of alumina, silica, and amorphous silica-alumina.

B10. The process according to Item B1, wherein the hydrogenated light cycle oil has a bicyclic aromatics content of no more than about 10% by weight and an initial boiling point of greater than about 165° C.

B11. The process according to Item B1, wherein the first riser reactor and the second riser reactor are each independently an equal-diameter riser reactor with or without a fluidized bed reactor, or a variable-diameter riser reactor with or without a fluidized bed reactor.

B12. The process according to Item B1, wherein the regenerated catalyst is cooled to a temperature between about 500 and about 680° C. and sent to the second riser reactor. B13. The process according to Item B1, wherein the first nozzle and the second nozzle are spaced apart from each other from up to down, and the second nozzle is disposed below the first nozzle, and the reaction time in the riser reaction section between the second nozzle and the first nozzle is between about 0.01 and about 2 seconds.

B14. The process according to Item B13, wherein the reaction time in the riser reactor section between the second nozzle and the first nozzle is between about 0.05 and about 1 second.

B15. The process according to Item B1, wherein the conditions of the first catalytic cracking reaction include: a reaction temperature ranging from about 480 to about 650° C., a catalyst-to-oil ratio ranging from about 2 to about 100, a reaction time ranging from about 1 to about 10 seconds, a reaction pressure ranging from about 0.15 to about 0.4 MPa, a steam-to-oil weight ratio (i.e., a weight ratio of steam to the heavy feedstock oil) ranging from about 0.01 to about 0.5, and a micro-activity of the first catalytic cracking catalyst of not less than about 55, as measured by the test method of RIPP 92-90 in catalytic cracking field for determining the micro-activity of equilibrium catalysts;
the conditions of the second catalytic cracking reaction include: a reaction temperature ranging from about 400 to about 650° C., a catalyst-to-oil ratio ranging from about 5 to about 100, a reaction time ranging from about 0.01 to about 10 seconds, a reaction pressure ranging from about 0.15 to about 0.4 MPa, a steam-to-oil weight ratio (i.e., a weight ratio of steam to the total amount of the feedstock oil) ranging from about 0.01 to about 0.5, and a micro-activity of the second catalytic cracking catalyst of not less than about 55.

B16. The process according to Item B1, wherein the first catalytic cracking catalyst comprises, on a dry basis, about 10% to about 50% by weight of a zeolite, about 5% to about 90% by weight of an inorganic oxide and about 0% to about 70% by weight of a clay, based on the weight of the first catalytic cracking catalyst;

the second catalytic cracking catalyst comprises, on a dry basis, about 10% to about 50% by weight of a zeolite, about 5% to about 90% by weight of an inorganic oxide and about 0% to about 70% by weight of a clay, based on the weight of the second catalytic cracking catalyst; the zeolite is at least one selected from the group consisting of a Y zeolite with or without a rare earth element, an HY zeolite with or without a rare earth element, a USY zeolite with or without a rare earth element, and a Beta zeolite with or without a rare earth element.

EXAMPLES

The present application will be further illustrated with reference to the following examples, but the present application is not limited thereto.

Starting Materials and Reagents

In the following examples and comparative examples, the hydrogenation catalyst with a trade name of RN-32V, and the protective agent with a trade name of RG-1 charged in the hydrotreating unit were both manufactured by Sinopec Catalyst Branch. The hydrogenation catalyst and the protective agent were loaded at a volume ratio of 95:5.

In the following examples and comparative examples, the catalytic cracking catalyst with a trade name of CC20-DV used in the riser reactor was manufactured by Sinopec Catalyst Branch, and its physicochemical properties are shown in Table 1.

TABLE 1

Physicochemical properties of the catalyst CC20-DV

| Item | | Unit | Value |
|---|---|---|---|
| Physical properties | | | |
| Specific area | | m²/g | 96 |
| Specific area of substrate | | m²/g | 42 |
| Specific area of micropores | | m²/g | 54 |
| Pore volume | | ml/g | 0.144 |
| Micropore volume | | ml/g | 0.026 |
| Weight percent of metal | | | |
| Fe | | wt % | 0.47 |
| Ni | | wt % | 0.65 |
| V | | wt % | 0.14 |
| Ca | | wt % | 0.08 |
| Particle size | 0-20 μm | vol % | 3.5 |
| | 0-80 μm | vol % | 54.8 |
| | 0-149 μm | vol % | 97.2 |
| Micro-activity | | wt % | 62 |

The properties of the heavy feedstock oil used in the following examples and comparative examples are listed in Table 2.

TABLE 2

Properties of the heavy feedstock oil

| Name | Heavy oil |
|---|---|
| Density (20° C.), kg/m³ | 927.8 |
| Refractive index (70° C.) | 1.5015 |
| Freezing point, ° C. | 26 |
| Carbon residue, wt % | 3.63 |
| Viscosity (80° C.)/(mm²/s) | 26.23 |
| Viscosity (100° C.)/(mm²/s) | 14.26 |
| Condensation point/° C. | 26 |
| Basic nitrogen content/(μg/g) | 595 |
| Hydrocarbon composition/wt % | |
| Saturated hydrocarbons | 58.6 |
| Aromatic hydrocarbons | 32.0 |
| Gum | 8.8 |
| Asphaltene | 0.6 |
| Sulfur content/(μg/g) | 11 200 |
| Carbon content/wt % | 86.26 |
| Hydrogen content/wt % | 12.28 |
| Nitrogen content/wt % | 0.19 |
| Ni content/(μg/g) | 7.1 |
| V content/(μg/g) | 7.5 |
| Fe content/(μg/g) | 3.2 |

Calculation of Parameters

Recycle ratio of Light cycle oil (LCO)=weight of the light cycle oil hydrogenated and refined/weight of the heavy feedstock oil.

Hydrogen consumption=amount of fresh hydrogen consumed in the hydrotreating unit/weight of fresh feed to the hydrotreating unit.

Method of Measurement

The research octane number (RON) of the gasoline product was measured according to the method of GB/T 5487-2015, and the motor octane number (MON) of the gasoline product was measured according to the method of GB/T 503-2016.

The micro-activity (MAT) of the regenerated catalyst was determined according to the standard method of RIPP 92-90 (see "Petrochemical Analysis Method (RIPP Test Method)", edited by Cuiding Yang, et. al., Science Press, September 1990, First Version, pages 263-268) under the following conditions: catalyst: 5.0 g (20-40 mesh); oil intake: 1.56 grams; reaction time: 70 seconds; reaction temperature: 460° C.; catalyst/oil: 3.2; and space velocity: 16 h⁻¹.

The hydrocarbon composition of the cracking gas was determined according to the standard method of RIPP 77-90 (see "Petrochemical Analysis Method (RIPP Test Method)", edited by Cuiding Yang, et. al., Science Press, September 1990, First Version, pages 208-211) under the following conditions: a valve chamber temperature of 65° C. (18 minutes), raised to 120° C. (20 minutes) at 5° C. per minute; FID: 200° C.; and TCD: 150° C.

The hydrocarbon composition of the gasoline is determined according to the standard method of RIPP85-90 (see "Petrochemical Analysis Method (RIPP Test Method)", edited by Cuiding Yang, et. al., Science Press, September 1990, First Version, pages 443-445) under the following conditions: injection system temperature: 200° C.; electron energy: 70 eV; emission current: 300 μA; ionization chamber temperature: 200° C.; resolution: greater than 300; and scanning mode: exponential sweep.

Example 1

This example was carried out in accordance with the process flow shown in FIG. 1. The heavy feedstock oil was sprayed into the riser reactor via the first nozzle to conduct a catalytic cracking reaction. The reaction conditions in the riser reactor were as follows: a reaction temperature of 515° C., a weight ratio of catalytic cracking catalyst to the heavy feedstock oil of 6, a reaction time of the heavy feedstock oil of 3.2 seconds, a reaction pressure (absolute pressure) of 0.32, a weight ratio of steam to the heavy feedstock oil of 0.06, and a micro-activity (MAT) of the regenerated catalyst of 62. The catalytic cracking product from the riser reactor was fractionated in the main fractionating column, producing a catalytic cracking gasoline and a catalytic cracking light cycle oil.

The resultant catalytic cracking gasoline was split in a gasoline fractionating column in accordance with the distillation range, producing a light gasoline fraction, a medium gasoline fraction and a heavy gasoline fraction. The distillation range of each fraction was as follows: the distillation range of the light gasoline fraction was <60° C., the distillation range of the medium gasoline fraction was 90-120° C., and the distillation range of the heavy gasoline fraction was >120° C. In this example, 30% by weight of the light gasoline fraction and 50% by weight of the medium gasoline fraction were recycled to the riser reactor, and the remaining gasoline fractions were sent to the subsequent absorption-stabilization unit.

The resultant catalytic cracking light cycle oil was sent to a hydrotreating unit, producing a hydrogenated light cycle oil having an initial boiling point of 180° C., a bicyclic aromatics content of 15% by weight, and a hydrogen content of 11% by weight. The conditions of the hydrotreatment were as follows: a hydrogen partial pressure of 10.0 MPa, an average bed reaction temperature of 354° C., a volume space velocity of 0.5 h$^{-1}$, and a hydrogen/oil volume ratio of 1400 Nm$^3$/m$^3$. In this example, 100% by weight of the hydrogenated light cycle oil was recycled to the riser reactor.

The medium gasoline fraction was sprayed into the riser reactor via the third nozzle, and the mixed fraction of the light gasoline fraction and the hydrogenated light cycle oil was sprayed into the riser reactor via the second nozzle. The reaction time in the riser reactor section between the third nozzle and the second nozzle was 0.2 seconds, and the reaction time in the riser reactor section between the second nozzle and the first nozzle was 0.3 seconds. The reaction results are shown in Table 3.

Comparative Example 1

The experiment was carried out as described in Example 1, except that the catalytic cracking gasoline and the catalytic cracking light cycle oil obtained by fractional distillation were not recycled to the riser reactor, but instead the catalytic cracking gasoline was directly sent to the subsequent absorption-stabilization unit, and the catalytic cracking light cycle oil was taken directly as a product. The reaction results are shown in Table 3.

Comparative Example 2

The experiment was carried out as described in Example 1, except that the catalytic cracking gasoline was not subjected to the splitting procedure, but instead 30% by weight of the catalytic cracking gasoline was directly sprayed into the riser reactor via the third nozzle, the remaining portion of the catalytic cracking gasoline was sent to the subsequent absorption-stabilization unit, and 100% by weight of the hydrogenated light cycle oil was sprayed into the riser reactor via the second nozzle. The reaction results are shown in Table 3.

Comparative Example 3

The experiment was carried out as described in Example 1, except that the medium gasoline fraction was not recycled, a mixed fraction of 50% by weight of the light gasoline fraction and 100% by weight of the hydrogenated light cycle oil was sprayed into the riser reactor via the second nozzle, and the remaining gasoline fractions were sent to the subsequent absorption-stabilization unit. The reaction results are shown in Table 3.

Comparative Example 4

The experiment was carried out as described in Example 1, except that the catalytic cracking gasoline obtained by fractional distillation was not recycled to the riser reactor but directly sent to the subsequent absorption-stabilization unit, and 100% by weight of the hydrogenated light cycle oil was sprayed into the riser reactor via the second nozzle. The reaction results are shown in Table 3.

Comparative Example 5

The experiment was carried out as described in Example 1, except that the light gasoline fraction was not recycled, 100% by weight of the hydrogenated light cycle oil was sprayed into the riser reactor via the second nozzle, 50% by weight of the medium gasoline fraction was sprayed into the riser reactor via the third nozzle, and the remaining gasoline fractions were sent to the subsequent absorption-stabilization unit. The reaction results are shown in Table 3.

TABLE 3

Results of Example 1 and Comparative Examples 1-5

| Item | Ex. 1 | Comp. Ex. 1 | Comp. Ex. 2 | Comp. Ex. 3 | Comp. Ex. 4 | Comp. Ex. 5 |
|---|---|---|---|---|---|---|
| Recycle ratio of LCO | 0.37 | 0.00 | 0.43 | 0.40 | 0.35 | 0.41 |
| Hydrogen consumption (relative to fresh feed), wt % | 0.93 | 0.0 | 1.08 | 1.0 | 0.92 | 1.01 |
| Product distribution, wt % | | | | | | |
| Dry gas | 4.2 | 3.46 | 4.90 | 4.61 | 4.30 | 4.56 |
| Liquefied gas | 22.65 | 18.32 | 24.39 | 23.96 | 22.67 | 23.58 |
| Gasoline | 58.83 | 42.95 | 55.32 | 56.58 | 57.80 | 56.86 |
| Light diesel oil | 0.00 | 21.74 | 0.00 | 0.00 | 0.00 | 0.00 |

TABLE 3-continued

Results of Example 1 and Comparative Examples 1-5

| Item | Ex. 1 | Comp. Ex. 1 | Comp. Ex. 2 | Comp. Ex. 3 | Comp. Ex. 4 | Comp. Ex. 5 |
|---|---|---|---|---|---|---|
| Heavy oil | 4.62 | 4.74 | 5.42 | 4.95 | 5.34 | 5.05 |
| Coke | 9.70 | 8.79 | 9.97 | 9.90 | 9.89 | 9.95 |
| Total | 100.00 | 100.0 | 100.00 | 100.00 | 100.00 | 100.00 |
| Gasoline properties | | | | | | |
| Olefin content, vol % | 14.6 | 26.2 | 18.4 | 14.8 | 22.5 | 19.4 |
| Aromatics content, vol % | 34.8 | 21.2 | 25.2 | 27.9 | 23.6 | 22.2 |
| Sulfur content, ppm | 342 | 537.4 | 349.6 | 350.2 | 349.5 | 348.5 |
| RON | 93.2 | 91.6 | 91.9 | 90.2 | 91.5 | 92.0 |
| MON | 82.7 | 81.0 | 81.3 | 80.4 | 81.5 | 82.1 |

In Comparative Example 1, a conventional catalytic cracking process was performed, and both the catalytic cracking gasoline and the catalytic cracking light cycle oil were not re-refined; in Comparative Example 2, the light cycle oil was hydrogenated and re-refined, and at the same time, a part of the catalytic cracking gasoline was directly re-refined; in Comparative Example 3, the light cycle oil was hydrogenated, and then re-refined together with a part of the light gasoline fraction; in Comparative Example 4, only the light cycle oil was hydrogenated and re-refined, while the catalytic cracking gasoline was not re-refined; and in Comparative Example 5, the light cycle oil was hydrogenated and re-refined, and at the same time, a part of the medium gasoline fraction was re-refined.

As compared with Comparative Example 1, Comparative Example 2 provides a conversion of the light cycle oil and an increased yield of gasoline. But in order to reduce the olefin content of the gasoline, 30% by weight of the catalytic cracking gasoline was re-refined in Comparative Example 2, which means a loss of the gasoline yield. Meanwhile, the re-refining of the gasoline led to the production of additional light cycle oil, resulting in a higher recycle ratio of light cycle oil. The olefin content of the gasoline is significantly reduced, but the octane number is still low.

As compared with Comparative Example 1, Comparative Example 3 provides an increased production of gasoline and a significant reduction of the olefin content of the gasoline, but the octane number of the gasoline is also significantly reduced.

As compared with Comparative Example 1, Comparative Example 4 provides an increased production of gasoline and a reduction of the olefin content of the gasoline, but the octane number of the gasoline is still at a lower level.

As compared with Comparative Example 1, Comparative Example 5 provides an increased production of gasoline and a significant reduction of the olefin content of the gasoline, but the octane number of the gasoline is still low.

As compared with Comparative Example 1, Example 1 provides not only a conversion of the light cycle oil, but also a greatly increased production of gasoline, with the gasoline product showing a lower olefin content and a higher octane number; as compared with Comparative Example 2, Example 1 provides a reduced recycle ratio of light cycle oil, a reduced hydrogen consumption, and an increased yield of gasoline, with the gasoline product showing a lower olefin content and a higher octane number; as compared with Comparative Example 3, Example 1 provides a reduced recycle ratio of light cycle oil, a reduced hydrogen consumption, and an increased yield of gasoline, with the gasoline product showing a comparable olefin content and a higher octane number; as compared with Comparative Example 4, Example 1 provides not only a conversion of the light cycle oil, but also an increased yield of gasoline, with the gasoline product showing a lower olefin content and a higher octane number, due to the re-refining of the light gasoline fraction and the medium gasoline fraction; and as compared with Comparative Example 5, Example 1 provides not only a promotion of the cracking of the hydrogenated light cycle oil, but also an increased yield of gasoline, with the gasoline product showing a lower olefin content and a higher octane number, due to the re-refining of the light gasoline fraction in mixture with the hydrogenated light cycle oil.

Example 2

This example is carried out in accordance with the process flow shown in FIG. 2. The heavy feedstock oil was sprayed into the first riser reactor via the first nozzle to conduct a catalytic cracking reaction under the following conditions: a reaction temperature of 515° C., a catalyst-to-oil ratio of 6, a reaction time of 3.2 seconds, a reaction pressure (absolute pressure) of 0.32 MPa, a weight ratio of steam to the heavy feedstock of 0.06, and a micro-activity (MAT) of the regenerated catalyst of 62. The first reaction product from the first riser reactor was sent to the main fractionating column for fractional distillation together with the second reaction product from the second riser reactor, producing a catalytic cracking gasoline and a catalytic cracking light cycle oil.

The resultant catalytic cracking gasoline was split in a gasoline fractionating column in accordance with the distillation range, producing a light gasoline fraction, a medium gasoline fraction and a heavy gasoline fraction. The distillation range of each fraction was as follows: the distillation range of the light gasoline fraction was <60° C., the distillation range of the medium gasoline fraction was 90-120° C., and the distillation range of the heavy gasoline fraction was >120° C. In this example, 20% by weight of the light gasoline fraction and 50% by weight of the medium gasoline fraction were recycled to the second riser reactor, and the remaining gasoline fractions were sent to the subsequent absorption-stabilization unit.

The resultant catalytic cracking light cycle oil was sent to the hydrotreating unit, producing a hydrogenated light cycle oil having an initial boiling point of 180° C., a bicyclic aromatics content of 15% by weight, and a hydrogen content of 11% by weight. The conditions of the hydrotreatment were as follows: a hydrogen partial pressure of 10.0 MPa, an average bed reaction temperature of 354° C., a volume space velocity of 0.5 h$^{-1}$, and a hydrogen/oil volume ratio of 1400

$Nm^3/m^3$. In this example, 100% by weight of the hydrogenated light cycle oil was recycled to the second riser reactor.

The medium gasoline fraction was sprayed into the second riser reactor via the third nozzle, and the mixed fraction of the light gasoline fraction and the hydrogenated light cycle oil was sprayed into the second riser reactor via the second nozzle. The reaction time in the riser reactor section between the second nozzle and the third nozzle was 0.2 seconds.

The reaction conditions in the second riser reactor were as follows: a reaction temperature of 485° C.; a catalyst-to-oil ratio (based on the total amount of the feedstock oil) of 20, a reaction time (in this example, referring to the reaction time of the feedstock oil sprayed via the third nozzle) of 0.8 seconds, a reaction pressure (absolute pressure) of 0.32 MPa; a weight ratio of steam to the total amount of the feedstock oil of 0.02, and a micro-activity (MAT) of the regenerated catalyst of 62. The regenerated catalyst was cooled by the catalyst cooler to a temperature of 620° C. before entering the second riser reactor. The second reaction product from the second riser reactor was sent to the main fractionating column for fractional distillation together with the first reaction product from the first riser reactor. The reaction results are shown in Table 4.

Example 3

The experiment was carried out as described in Example 2, except that the regenerated catalyst recycled to the second riser reactor was not cooled. The reaction results are shown in Table 4.

Comparative Example 6

The experiment was carried out as described in Example 2, except that the catalytic cracking gasoline was not subject to the splitting procedure, but instead 30% by weight of the catalytic cracking gasoline was directly sprayed into the second riser reactor via the third nozzle, and the remaining portion of the catalytic cracking gasoline was sent to the subsequent absorption-stabilization unit; 100% by weight of the hydrogenated light cycle oil was sprayed into the second riser reactor via the second nozzle; and the regenerated catalyst recycled to the second riser reactor was not cooled. The reaction results are shown in Table 4.

Comparative Example 7

The experiment was carried out as described in Example 2, except that the medium gasoline fraction was not recycled, a mixed fraction of 50% by weight of the light gasoline fraction and 100% by weight of the hydrogenated light cycle oil was sprayed into the second riser via the second nozzle, the remaining gasoline fractions were sent to the subsequent absorption-stabilization unit, and the regenerated catalyst recycled to the second riser reactor was not cooled. The reaction results are shown in Table 4.

Comparative Example 8

The experiment was carried out as described in Example 2, except that the catalytic cracking gasoline obtained by fractional distillation was not recycled to the riser reactor but directly sent to the subsequent absorption-stabilization unit, 100% by weight of the hydrogenated light cycle oil was sprayed into the second riser reactor via the second nozzle, and the regenerated catalyst recycled to the second riser reactor was not cooled. The reaction results are shown in Table 4.

Comparative Example 9

The experiment was carried out as described in Example 2, except that the light gasoline fraction was not recycled, 100% by weight of the hydrogenated light cycle oil was sprayed into the second riser reactor via the second nozzle, 50% by weight of the medium gasoline fraction was sprayed into the second riser reactor via the third nozzle, the remaining gasoline fractions were sent to the subsequent absorption-stabilization unit, and the regenerated catalyst recycled to the second riser reactor was not cooled. The reaction results are shown in Table 4.

TABLE 4

Results of Examples 2-3 and Comparative Examples 6-9

| Item | Ex. 2 | Ex. 3 | Comp. Ex. 6 | Comp. Ex. 7 | Comp. Ex. 8 | Comp. Ex. 9 |
|---|---|---|---|---|---|---|
| Recycle ratio of LCO | 0.32 | 0.32 | 0.42 | 0.39 | 0.35 | 0.40 |
| Hydrogen consumption, wt % | 0.8 | 0.8 | 1.05 | 0.98 | 0.95 | 1.00 |
| Product distribution, wt % | | | | | | |
| Dry gas | 3.71 | 4.31 | 4.75 | 4.41 | 4.11 | 4.36 |
| Liquefied gas | 21.65 | 22.02 | 24.02 | 23.26 | 22.97 | 23.08 |
| Gasoline | 60.72 | 59.82 | 56.07 | 57.78 | 58.30 | 57.86 |
| Light diesel oil | 0.00 | 0.00 | 0.00 | 0.00 | 0.00 | 0.00 |
| Heavy oil | 4.72 | 4.50 | 5.30 | 4.75 | 5.34 | 4.98 |
| Coke | 9.20 | 9.35 | 9.86 | 9.80 | 9.28 | 9.72 |
| Total | 100.00 | 100.00 | 100.00 | 100.00 | 100.00 | 100.00 |
| Gasoline properties | | | | | | |
| Olefin content, vol % | 14.0 | 15.0 | 18.2 | 14.6 | 21.5 | 18.6 |
| Aromatics content, vol % | 34.9 | 33.9 | 25.4 | 28.1 | 24.2 | 22.8 |
| Sulfur content, ppm | 333 | 333 | 346.8 | 347.6 | 350.5 | 349.5 |
| RON | 93.1 | 93.0 | 91.8 | 90.3 | 91.8 | 92.3 |
| MON | 82.9 | 82.5 | 81.5 | 81.4 | 80.9 | 82.1 |

In Comparative Example 6, the light cycle oil was hydrogenated and re-refined, and at the same time, a part of the catalytic cracking gasoline was directly re-refined; in Comparative Example 7, the light cycle oil was hydrogenated, and then re-refined together with a part of the light gasoline fractions; in Comparative Example 8, only the light cycle oil was hydrogenated and re-refined, and the catalytic cracking gasoline was not re-refined; and in Comparative Example 9, the light cycle oil was hydrogenated and re-refined, and at the same time, a part of the medium gasoline fraction was re-refined.

As compared with Comparative Example 1 adopting the conventional catalytic cracking process, Comparative Example 6 provides a conversion of the light cycle oil and an increased yield of gasoline, but the re-refining of the catalytic cracking gasoline resulted in a loss of the gasoline yield. Meanwhile, the re-refining of the gasoline led to the production of additional light cycle oil, resulting in a higher recycle ratio of light cycle oil. The olefin content of the gasoline is significantly reduced, but the octane number is still low.

As compared with Comparative Example 1, Comparative Example 7 provides an increased production of gasoline and a significant reduction of the olefin content of the gasoline, but the octane number of the gasoline is also significantly reduced.

As compared with Comparative Example 1, Comparative Example 8 provides an increased production of gasoline and a reduction of the olefin content of the gasoline, but the octane number of the gasoline is still at a lower level.

As compared with Comparative Example 1, Comparative Example 9 provides an increased production of gasoline and a significant reduction of the olefin content of the gasoline, but the octane number of the gasoline is still low.

As compared with Comparative Example 1, Examples 2 and 3 provide not only a conversion of the light cycle oil, but also a greatly increased production of gasoline, with the gasoline product showing a lower olefin content and a higher octane number; as compared with Comparative Example 6, Examples 2 and 3 provide a reduced recycle ratio of light cycle oil, a reduced hydrogen consumption, and an increased yield of gasoline, with the gasoline product showing a lower olefin content and a higher octane number; as compared with Comparative Example 7, Examples 2 and 3 provide a reduced recycle ratio of light cycle oil, a reduced hydrogen consumption, and an increased yield of gasoline, with the gasoline product showing a comparable olefin content and a higher octane number; as compared with Comparative Example 8, Examples 2 and 3 provide not only a conversion of the light cycle oil, but also an increased yield of gasoline, with the gasoline product showing a lower olefin content and a higher octane number, due to the re-refining of the light gasoline fraction and the medium gasoline fraction; and as compared with Comparative Example 9, Examples 2 and 3 provide not only a promotion of the cracking of the hydrogenated light cycle oil, but also an increased yield of gasoline, with the gasoline product showing a lower olefin content and a higher octane number, due to the re-refining of the light gasoline fraction in mixture with the hydrogenated light cycle oil.

As compared with Example 3, by reducing the temperature of the regenerated catalyst entering the second riser reactor, Example 2 provides a further improvement in product distribution, a reduced yield of dry gas and coke, and an increased yield of gasoline, with the gasoline product showing a lower olefin content and a higher octane number.

In the foregoing description, the concepts of the present application have been described with reference to specific embodiments. However, it can be appreciated that various modifications and changes can be made without departing from the scope of the invention as set forth in the appended claims. Accordingly, the specification and drawings are to be regarded in an illustrative rather than a restrictive sense, and all such modifications and changes are intended to be included within the scope of the present application.

It can also be appreciated that various features that are, for clarity, described herein in the context of separate embodiments may also be provided in combination in a single embodiment. Meanwhile, various features that are, for brevity, described in the context of a single embodiment may also be provided separately or in any sub-combination.

What is claimed:

1. A catalytic cracking process, comprising:
   i) feeding a heavy feedstock oil into a first riser reactor via a first nozzle for catalytic cracking therein to obtain a catalytic cracking reaction product;
   ii) separating the catalytic cracking reaction product to obtain a catalytic cracking gasoline and a catalytic cracking light cycle oil;
   iii) separating the catalytic cracking gasoline obtained in step ii) to obtain a light gasoline fraction, a medium gasoline fraction, and a heavy gasoline fraction;
   iv) subjecting the catalytic cracking light cycle oil obtained in step ii) to hydrotreating to obtain a hydrogenated light cycle oil;
   v) mixing a portion of the light gasoline fraction obtained in step iii) with at least a portion of the hydrogenated light cycle oil obtained in step iv) to obtain a mixed fraction;
   vi) feeding the mixed fraction obtained in step v) into jja the first riser reactor or a second reactor via a second nozzle for catalytic cracking therein; and
   vii) feeding a portion of the medium gasoline fraction obtained in step iii) into the first riser reactor or the second riser reactor via a third nozzle for catalytic cracking therein,
   wherein a cut point between the light gasoline fraction and the medium gasoline fraction is between about 60° C. and about 80° C., and a cut point between the medium gasoline fraction and the heavy gasoline fraction is between about 120° C. and about 130° C.

2. The process according to claim 1, wherein the heavy feedstock oil, the mixed fraction, and the portion of medium gasoline fraction are respectively fed into the first riser reactor via the first nozzle, the second nozzle, and the third nozzle, disposed along a vertical direction of the riser reactor, wherein the first nozzle is disposed above the second nozzle, and the second nozzle is disposed above the third nozzle.

3. The process according to claim 1, wherein the heavy feedstock oil is fed into flail the first riser reactor via the first nozzle; and wherein the mixed fraction and the portion of medium gasoline fraction are respectively fed into Hall the second riser reactor via the second nozzle and the third nozzle disposed along a vertical direction of the second riser reactor, and wherein the second nozzle is disposed above the third nozzle.

4. The process according to claim 2, wherein a reaction time in the riser reactor section between the second nozzle and the first nozzle is between about 0.01 and about 3 seconds.

5. The process according to claim 2, wherein reaction conditions in the riser reactor comprises a reaction temperature ranging from about 480 to about 650° C., a weight ratio of catalytic cracking catalyst to the heavy feedstock oil ranging from about 2 to about 100, a reaction time of the heavy feedstock oil ranging from about 1 to about 10 seconds, a reaction pressure ranging from about 0.15 to about 0.4 MPa, a weight ratio of steam to the heavy feedstock oil ranging from about 0.01 to about 0.5, and a micro-activity (MAT) of catalytic cracking catalyst of not less than about 55.

6. The process according to claim 3, wherein reaction conditions in the first riser reactor comprises a reaction temperature ranging from about 480 to about 650° C., catalyst-to-oil ratio ranging from about 2 to about 100, a reaction time ranging from about 1 to about 10 seconds, a reaction pressure ranging from about 0.15 to about 0.4 MPa, and a weight ratio of steam to the heavy feedstock oil ranging from about 0.01 to about 0.5, a micro-activity (MAT) of catalytic cracking catalyst of not less than about 55, and, reaction conditions in the second riser reactor comprises a reaction temperature ranging from about 400 to about 650° C., a catalyst-to-oil ratio ranging from about 5 to about 100, a reaction time ranging from about 0.01 to 10 seconds, a reaction pressure ranging from about 0.15 to about 0.4 MPa, a weight ratio of steam to the total amount of the feedstock oil ranging from about 0.01 to about 0.5, and a micro-activity (MAT) of catalytic cracking catalyst of not less than about 55.

7. The process according to claim 2, wherein a reaction time in the riser reactor section between the third nozzle and the second nozzle is in a range from about 0.01 to about 2 seconds.

8. The process according to claim 3, wherein a reaction time in the riser reactor section between the third nozzle and the second nozzle is in a range from about 0.01 to about 2 seconds.

9. The process according to claim 1, wherein the medium gasoline fraction subjected to flail catalytic cracking in step vii) has a distillation range within a range from about 90 to 130° C.

10. The process according to claim 1, wherein about 2% to about 90% by weight, of the medium gasoline fraction is subjected to Hail catalytic cracking in step vii).

11. The process according to claim 2, wherein in step v), about 2% to about 90% by weight of the light gasoline fraction is mixed with about 10% to about 100% by weight of the hydrogenated light cycle oil to obtain the mixed fraction.

12. The process according to claim 1, in, wherein the hydrotreating step iv) is carried out in the presence of a hydrogenation catalyst comprising a support and an active component supported thereon, the active component is selected from the group consisting of a Group VIB metal, a Group VIII non-noble metal, and combinations thereof, and the support is selected from the group consisting of alumina, silica, amorphous silica-alumina, and combinations thereof.

13. The process according to claim 1, wherein the hydrotreating step iv) is carried out under conditions comprising a reaction temperature ranging from about 330 to about 450° C., a hydrogen partial pressure ranging from about 6 to about 25 MPa, a volume space velocity ranging from about 0.1 to about 20 h$^{-1}$, and a hydrogen-to-oil volume ratio ranging from about 1000 to about 2000 Nm$^3$/m$^3$.

14. The process according to claim 1, wherein the hydrotreating step iv) is carried out to an extent that the resultant hydrogenated light cycle oil has a bicyclic aromatics content of no more than about 20% by weight, a hydrogen content of no less than about 11% A by weight, and an initial boiling point of greater than about 165° C.

15. The process according to claim 1, wherein the first riser reactor and the second riser reactor are independently an equal-diameter riser reactor with or without a fluidized bed reactor, or a variable-diameter riser reactor with or without a fluidized bed reactor.

16. The process according to claim 1, wherein the catalytic cracking reactions of steps i), vi) and vii) are carried out in the presence of a catalytic cracking catalyst, and the catalytic cracking catalysts used in steps i), vi) and vii) each independently comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is kaolin, halloysite, or a mixture thereof.

17. The process according to claim 12, wherein the active component is nickel-tungsten, nickel-tungsten-cobalt, nickel-molybdenum, or cobalt-molybdenum.

18. The process according to claim 12, wherein the hydrogenation catalyst comprises from about 70% to about 85% by weight of the support and from about 15% to about 30% by weight of the active component.

* * * * *